United States Patent [19]

Greenside et al.

[11] Patent Number: 4,721,595
[45] Date of Patent: Jan. 26, 1988

[54] FIRST WALL FOR POLARIZED FUSION REACTORS

[75] Inventors: Henry S. Greenside, Cranbury; Robert V. Budny, Princeton, both of N.J.; Douglass E. Post, Jr., Buttonwood, Conn.

[73] Assignee: The United States of America as represented by the United States Department of Energy, Washington, D.C.

[21] Appl. No.: 696,273

[22] Filed: Jan. 29, 1985

[51] Int. Cl.⁴ .............................................. G21B 1/00
[52] U.S. Cl. .................................................. 376/150
[58] Field of Search ................ 376/136, 150, 133, 183

[56] References Cited

U.S. PATENT DOCUMENTS 4,145,250  3/1979  Ohkawa et al. ..................... 376/150
4,264,413  4/1981  Ohkawa ............................... 376/133
4,414,176  11/1983  Krauss et al. ...................... 576/150

OTHER PUBLICATIONS

Lurio et al., "First Wall Material for a Controlled Thermonuclear Reactor", IBM Tech. Discl., Bulletin, vol. 18, No. 6, Nov. 1975.

Primary Examiner—Stephen C. Bentley
Assistant Examiner—Richard L. Klein
Attorney, Agent, or Firm—Jeannette M. Walder; Gustavo Siller, Jr.; Judson R. Hightower

[57] ABSTRACT

Depolarization mechanisms arising from the recycling of the polarized fuel at the limiter and the first-wall of a fusion reactor are greater than those mechanisms in the plasma. Rapid depolarization of the plasma is prevented by providing a first-wall or first-wall coating formed of a low-Z, non-metallic material having a depolarization rate greater than 1 sec$^{-1}$.

8 Claims, 1 Drawing Figure

FIRST WALL FOR POLARIZED FUSION REACTORS

CONTRACTUAL ORIGIN OF THE INVENTION

The United States Government has rights in this invention under Contract No. DE-AC02-76CH03073 between the U.S. Department of Energy and Princeton University.

BACKGROUND OF THE INVENTION

This invention relates generally to polarized fusion reactors, i.e. reactors employing polarized fuel; and, more particularly, to reactor first-walls and first-wall coatings.

Kulsrud, Furth, Valeo, and Goldhaber have shown and described in U.S. patent application Ser. No. 492,924, filed May 9, 1983 how the performance of magnetic confinement fusion reactors can be improved by using deuterium and tritium plasmas that are polarized in certain preferred directions. They showed that polarizing the plasma fuel ions enhances the different nuclear fusion rates and controls the angular distribution of emitted reaction products. The feasiblity of using polarized plasmas depends on the absence of physical mechanisms that can depolarize the plasma rapidly on the timescale of particle confinement ($\sim 1$ sec) or fuel burnup ($\sim 100$ sec). Kulsrud et al demonstrated that the depolarization mechanisms in the plasma are too weak to be relevant.

There are, however, other depolarization mechanisms present which have not been considered carefully, and which are more important than those occurring in the plasma. These arise from the recycling of D and T at the limiter and the first wall of the reactor vessel. In all magnetic confinement scheme studies to date, the D-T fuel leaks out across the magnetic field lines about 10 to 20 times faster than the rate of fuel consumption. (Indeed, for a burning plasma, the ions must leak out at an appreciable rate in order for the helium ash to leave the plasma core.) As a consequence, most particles leave the plasma, strike the limiter (or first wall) and reenter the plasma about 20 times before fusing or before being pumped away. About half the flux of particles striking the first wall is reflected back into the plasma. The remaining particles have sufficient kinetic energy (20–100 eV) to penetrate about 100 Å into the wall. There the D and T ions come to equilibrium and eventually diffuse back to the surface where they recombine and desorb as molecules, or are desorbed directly by ion, electron, and photon bombardment.

The D and T nuclei in the crystal lattice and in the vicinity of the wall surface are subject to depolarization mechanisms that are not present in the plasma core. In the plasma edge and in cracks or voids of the wall material, D and T can exist as polyatomic molecules. For these species, tumbling caused by rotation and collision of the molecules can flip the nuclear spins. For absorbed D and T residing in the crystalline lattice, depolarization can occur by thermal diffusion and by photon and electron induced fluctuations of microscopic magnetic fields and electric field gradients (which couple to nuclear magnetic dipole and electrical quadrupole moments respectively).

These new mechanisms can greatly reduce the nuclear magnetization of D and T on timescales of $10^{-3}$ and $10^1$ seconds. Since the mean residence times of absorbed D and T in the wall are also comparable with these timescales, a careful choice of the composition and temperature of the first wall and limiter is crucial in preventing rapid depolarization of the plasma.

Therefore, it is an object of the present invention to provide a first-wall or first-wall coating which prevents rapid depolarization of a polarized plasma.

It is another object of the present invention to provide a method of preventing (or minimizing) rapid depolarization of a polarized plasma in a fusion reactor.

Additional objects, advantages, and novel features of the invention will be set forth in part in the description which follows, and in part will become apparent to those skilled in the art upon examination of the following or may be learned by practice of the invention.

SUMMARY OF THE INVENTION

To achieve the foregoing and other objects and in accordance with the purposes of the present invention, a first-wall or first-wall coating for use in a fusion reactor having polarized fuel may be formed of a low-Z non-metallic material having slow spin relaxation, i.e. a depolarization rate greater than 1 sec$^1$. Materials having these properties include hydrogenated and deuterated amorphous semiconductors.

A method for preventing the rapid depolarization of a polarized plasma in a fusion device may comprise the step of providing a first-wall or first-wall coating formed of a low-Z, non-metallic material having a depolarization rate greater than 1 sec$^{-1}$.

BRIEF DESCRIPTION OF THE DRAWINGS

The present invention is illustrated in the following drawing in which.

DETAILED DESCRIPTION OF THE INVENTION

Figure 1:
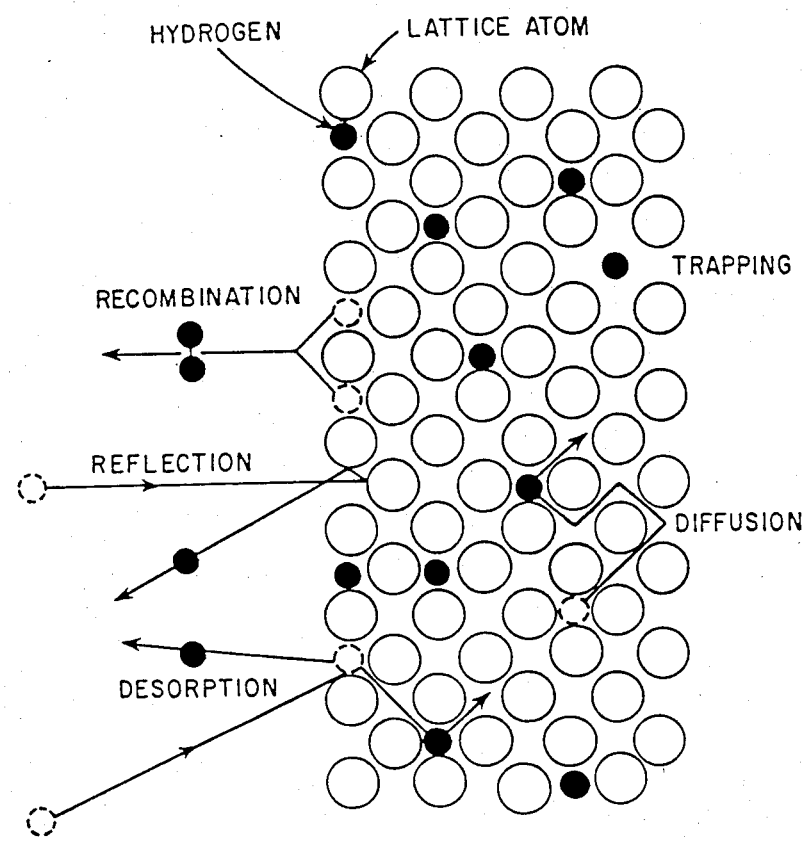
FIG. 1 is a schematic illustration of the plasma - wall interaction. The partially ionized cooler plasma near the wall is the plasma edge; diatomic and triatomic molecules in this region are the major source of edge depolarization. About 50% of incident ions (dark circles) are reflected by lattice atoms (open circles). Remaining nuclei enter the lattice and diffuse or become trapped. Nuclei on the surface desorb either by recombination or by collisions with incoming photons, electrons, and ions.

Referring to FIG. 1, the polarized nuclei in the walls constitute an ensemble of particles which are weakly coupled to external degrees of freedom (the "lattice") and to each other. These two kinds of couplings introduce two different macroscopic timescales, called the spin-lattice and spin-spin relaxation times in the NMR (Nuclear Magnetic Resonance) literature. These are denoted by $T_1$ and $T_2$ respectively.

If the ensemble of nuclei is not in thermal equilibrium with the surrounding lattice, energy is exchanged with the lattice until the occupation of each nuclear state is proportional to its Boltzmann factor, $\exp(-E_m/k_BT)$. Here $E_m$ is the energy of a particular nuclear state, $k_B$ is the Boltzmann constant, and $T$ is the absolute temperature of the lattice. For typical nuclear magnetic dipole moments $\mu$ (of order $10^{-24}$ ergs gauss$^{-1}$), in the presence of typical reactor fields $B=B_o z$ ($B_o \sim 10^5$ gauss), the equilibrium nuclear magnetization, which is proportional to $\tanh(\mu B_o/k_BT)$, is vanishingly small for $T \gtrsim \mu B_o/k_B$. Thus for typical wall temperatures ($T \gtrsim 300$ K for the wall, 1000 K for the limiter) polarized nuclei will relax to a zero equilibrium magnetization by exchanging energy with the lattice. This decay of nuclear magnetization often occurs exponentially over a timescale which is defined to be $T_1$, the spin-lattice relaxation time. The depolarization rate of nuclei is then simply $T_1^{-1}$.

Spin diffusion and $T_2$ do not play a role in wall depolarization. Reactor wall temperatures are so high that atomic diffusion will always transport nuclear magnetization more rapidly than spin diffusion. Furthermore, in a wall containing equal concentrations of D and T, energy-conserving spin flips are inhibited since nearest neighbor nuclei are likely to have different nuclear magnetic dipole moments.

$T_1$ (and $T_2$) can be easily measured by numerous NMR techniques, and has been measured for many hydrogen and deuterium containing substances. The depolarization rate depends on $T_2$, the spin-spin relaxation time, only at temperatures which are so low that atomic diffusion of the nuclei can be ignored. $T_1$ depends on two microscopic time-scales, the inverse Larmor frequency, $\omega_o^{-1}$, and the correlation time, $\tau_c$. Transitions which repopulate the nuclear quantum levels and depolarize the nuclei are induced by nuclear motion which modulates the nuclear magnetic dipole moment. The deuteron can also depolarize by modulation of its electric quadrupole moment, which is usually its dominant relaxation process.

The plasma edge is a transition region near the walls, typically 10–20 cm in radial extent, where the large densities and temperatures of the plasma core decrease to their small values at the wall. The partially ionized plasma of the edge contains charged and neutral species (e.g., $e^-$, D, $D^+$, T, $T^+$, $D_2$, $T_2$, DT, $DT^+$, $D_3^+$, $T_3^+$, etc.) which interact with each other. The densities of these species are typically of order $10^{10}$ to $10^{13}$ $cm^{-3}$. Most depolarization mechanisms in the edge are the same as those discussed by Kulsrud et al. for depolarization in the plasma core.

We note that the spin-rotation process which dominates the depolarization mechanisms of the plasma edge can also occur in cracks or voids of the wall material. On the surfaces of such interior volumes, nuclei can recombine into diatomic forms, tumble, and depolarize. Unlike the plasma edge, there are no collisions, except with the surface, which can break up the molecule before depolarization will occur; the situation is potentially more serious. The contribution of this process to the total depolarization rate will depend on the rate of collisions, the fraction of D and T in such voids, and the rate at which bulk nuclei exchange with nuclei in the gas phase, a highly surface and material dependent number. Spin-rotation is therefore important in materials in which hydrogen or helium is weakly soluble, leading to blistering and cracking under high flux rates. This means that first wall and limiter materials have high H and He solubilities.

The relaxation mechanisms of the bulk and surface regions of the limiter and first wall are closely related and are best discussed together. There are three important mechanisms: hyperfine coupling of nuclei to unbound (conduction) electrons, dipole-dipole interactions modulated by atomic diffusion, and interactions with paramagnetic impurities (unpaired bound electrons).

The electron depolarization rate increases with increasing temperature. Because of the large velocity of electrons at the Fermi level [of order $(2E_F/m_e)^{1/2} \simeq 10^8$ cm/sec)], the depolarization rate is also independent of the slow diffusive motion of nuclei at higher temperatures. Since a high temperature is needed to minimize the depolarization rates discussed below, the first wall materials must be nonmetallic to prevent significant plasma depolarization. More precisely, wall materials must have a small or vanishing density of s-electron states at the Fermi surface. A semimetal such as graphite has a small (lower-dimensional) Fermi surface and should give acceptable D and T electronic relaxation rates.

A strong source of nuclear depolarization in metals and nonmetals is interactions between the nuclear magnetic dipole moments, of diffusion D and T with nearby magnetic dipole moments, such as those of other diffusing nuclei, lattice nuclei, or unpaired bound electrons (paramagnetic impurities).

For a given wall material, the diffusional depolarization rate can be minimized by operating at the highest possible temperature compared to $T_d$ ($T_d$ is the temperature at which depolarization due to diffusion is minimized) assuming that $T_d$ is not larger than the melting or sublimation temperature. For transition metal hydrides, this means $T \gtrsim 500$ K. For nonmetals, the choice is less clear; it depends on the density of various traps and the distribution of trap energies. Temperatures near the sublimation point of nonmetals ($\gtrsim 1400$ K for graphite) may lead to unacceptable erosion rates and a large flux of wall impurities (e.g., carbon ions) into the plasma.

Another source of depolarization—perhaps the major source at high temperatures for nonmetals—is unpaired bound electrons such as dangling bonds, unfilled transition (3d) or rare earth (4f) valence shells of atoms, and electrons trapped by lattice defects. Since an external field causes such electronic magnetic moments to align on the average, they are called paramagnetic impurities.

A diffusing nucleus near such an impurity can rapidly depolarize for two reasons. First, the electron magnetic dipole moment is $\sim 10^3$ times larger than any nuclear moment; local microscopic magnetic fields are large ($\sim 10^4$ gauss at a separation of $10^{-8}$ cm). Second, unlike nuclear magnetic moments, paramagnetic impurities are strongly coupled to the lattice with spin-lattice relaxation times of order $10^{-9}$–$10^{-6}$ sec. A nucleus becomes strongly coupled to the lattice in the vicinity of such an impurity and can spin-flip.

A summary of the desirable properties for a suitable first-wall material is contained in Table 1.

Our analysis indicates that depolarization of the plasma by recycling in material walls is far more important than depolarization in the plasma core. Instead of depolarization rates $\lesssim 10^{-5}$ $sec^{-1}$ in the core, we can expect rates $\lesssim 1$ $sec^{-1}$ for nonmetallic walls at high temperatures. For some parameters, the mean residence time can be less than the spin-lattice relaxation time.

Hydrogenated (or deuterated) amorphous semiconductors satisfy most of the properties of Table 1 and are a suitable first-wall material. Hydrogenated amorphous semiconductors offer other advantages. First, a coating of a-Si:H over the limiter and walls would be easy to apply by introducing puffs of methane or silane under low discharges; the reactor need not be turned off and opened to apply new coatings. Second, because these materials have high concentrations of D and T already present, the flux of lattice nuclei into the plasma (a source of impurities) would be decreased compared to crystalline graphite or SiC (although graphite and SiC would also be suitable first-wall materials). Third, small amounts of dopants such as nitrogen could be used to tune the spin-lattice relaxation time, and perhaps the residence time. FinallY, the porosity of the coating could be varied by controlling the deposition rate. This can reduce the depolarization rate by providing a loose network of channels through which polarized nuclei can escape back to the surface. For a first wall coating, a thickness of at least 200 Å (or a range of 100–500 Å) would be sufficient. Although it is unlikely the polarized fuel components would diffuse any deeper than 200 Å, greater thicknesses may be used for other considerations such as structural stability.

Additional materials satisfying the properties of Table 1 include a-C:H, graphite, and SiC.

TABLE 1

| Desirable Properties of Wall and Limiter Materials | |
|---|---|
| PROPERTY | COMMENTS |
| High temperature | reduces dipolar, quadrupole, and paramagnetic relaxation; decreases residence time. |
| Nonmetallic materials | eliminates relaxation due to inelastic spin-flip collisions with conduction electrons. |
| Lattice nuclei have small or zero magnetic dipole moments | decrease diffusional relaxation |
| High H and He solubilities | avoid blistering of wall which can lead to internal sources of diatomic molecules and spin-rotation relaxation. |
| Rapid surface desorption by molecular recombination | minimize residence time by allowing nuclei to escape rapidly. |
| Low-Z atomic composition | avoid high-Z impurities in plasma that lead to high radiation loss. |
| Low surface and bulk concentrations or paramagnetic impurities | not easily controlled because of constant erosion and redeposition. |
| Cubic lattice symmetry | noncubic lattice sites can depolarize deuterons by quadrupole relaxation. |

The embodiments of this invention in which an exclusive property or privilege is claimed are defined as follows:

1. A fusion reactor comprising:
   a plasma fuel having polarized nuclei; and a first wall, said first wall including a coating formed of a material selected from the group consisting of a hydrogenated amorphous semiconductor and a deuterated amorphous semiconductor and wherein said coating has a varied porosity and further including small amounts of a nitrogen dopant in said coating.

2. The fusion reactor of claim 1 wherein said material is selected from the group consisting of a-Si:H and a-C:H.

3. The fusion reactor of claim 1 wherein said first-wall coating has a thickness of at least 200Å.

4. The fusion reactor of claim 1 wherein said first-wall coating has a thickness of from 100–500Å.

5. In a fusion reactor including a first wall and a plasma fuel having polarized nuclei, a method of preventing the rapid depolarization of said polarized plasma comprising the steps of:
   depositing a coating on said first wall, said coating formed of a material selected from a group consisting of a hydrogenated amorphous semiconductor and a deuterated amorphous semiconductor;
   doping said coating with nitrogen; and
   varying the porosity of said coating.

6. The method of claim 5 wherein said material is selected from the group consisting of a-Si:H and a-C:H.

7. The method of claim 5 wherein said coating is deposited to a thickness of at least 200Å.

8. The method of claim 5 wherein said coating is deposited to a thickness of from 100–500Å.

* * * * *